US010993387B1

(12) United States Patent
Tvetene

(10) Patent No.: US 10,993,387 B1
(45) Date of Patent: *May 4, 2021

(54) SOD HARVESTERS

(71) Applicant: Gregg Tvetene, Billings, MT (US)

(72) Inventor: Gregg Tvetene, Billings, MT (US)

(73) Assignee: TREBRO HOLDING, INC, Billings, MT (US)

( * ) Notice: Subject to any disclaimer, the term of this patent is extended or adjusted under 35 U.S.C. 154(b) by 376 days.

This patent is subject to a terminal disclaimer.

(21) Appl. No.: 15/732,268

(22) Filed: Oct. 17, 2017

Related U.S. Application Data

(63) Continuation-in-part of application No. 15/731,667, filed on Jul. 13, 2017, now Pat. No. 10,524,429.

(51) Int. Cl.
 *A01G 20/15* (2018.01)
(52) U.S. Cl.
 CPC .................................. *A01G 20/15* (2018.02)
(58) Field of Classification Search
 CPC ....................................................... A01G 20/15
 USPC ............................................................. 172/19
 See application file for complete search history.

(56) References Cited

U.S. PATENT DOCUMENTS

| | | | | |
|---|---|---|---|---|
| 3,653,448 A | * | 4/1972 | Morrill | A01G 20/15 172/19 |
| 3,877,584 A | * | 4/1975 | Holcombe | B65G 57/06 414/789.7 |
| 4,828,040 A | * | 5/1989 | Schumacher | A01G 20/15 172/19 |
| 4,966,239 A | * | 10/1990 | Hutchison | A01G 20/15 172/20 |
| 5,269,379 A | * | 12/1993 | Millar et al. | A01G 20/15 172/19 |
| 7,165,629 B2 | * | 1/2007 | Pohlman et al. | A01G 20/15 172/20 |

\* cited by examiner

*Primary Examiner* — Thomas B Will
*Assistant Examiner* — Joel F. Mitchell
(74) *Attorney, Agent, or Firm* — Johnson & Phung LLC

(57) ABSTRACT

A sod harvester with an increased sod harvesting rate obtainable through a reduction in the time for completion of a sod handling cycle with the reduction in time obtained through changes in the interactions of transfer mechanisms within the sod harvester.

12 Claims, 8 Drawing Sheets

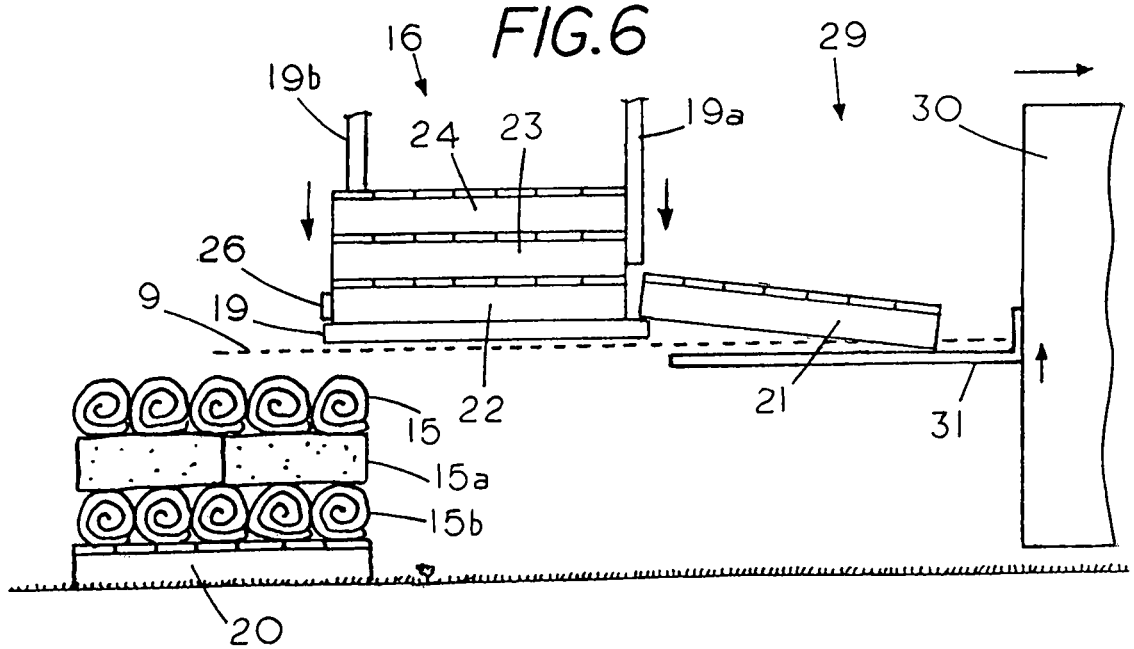
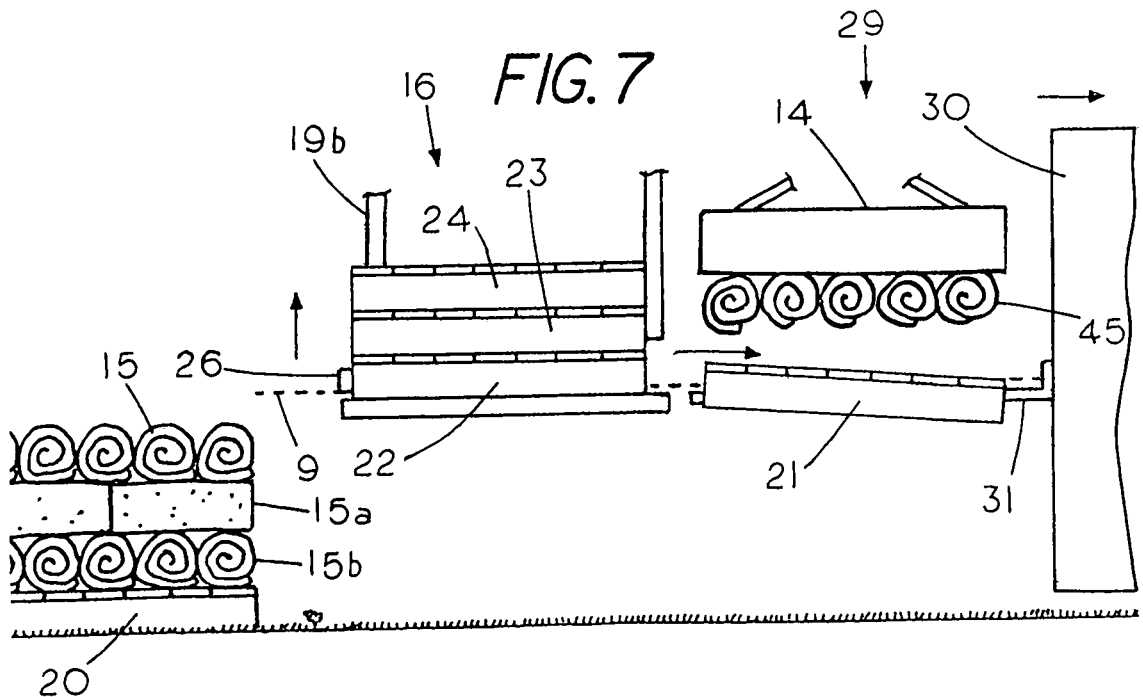

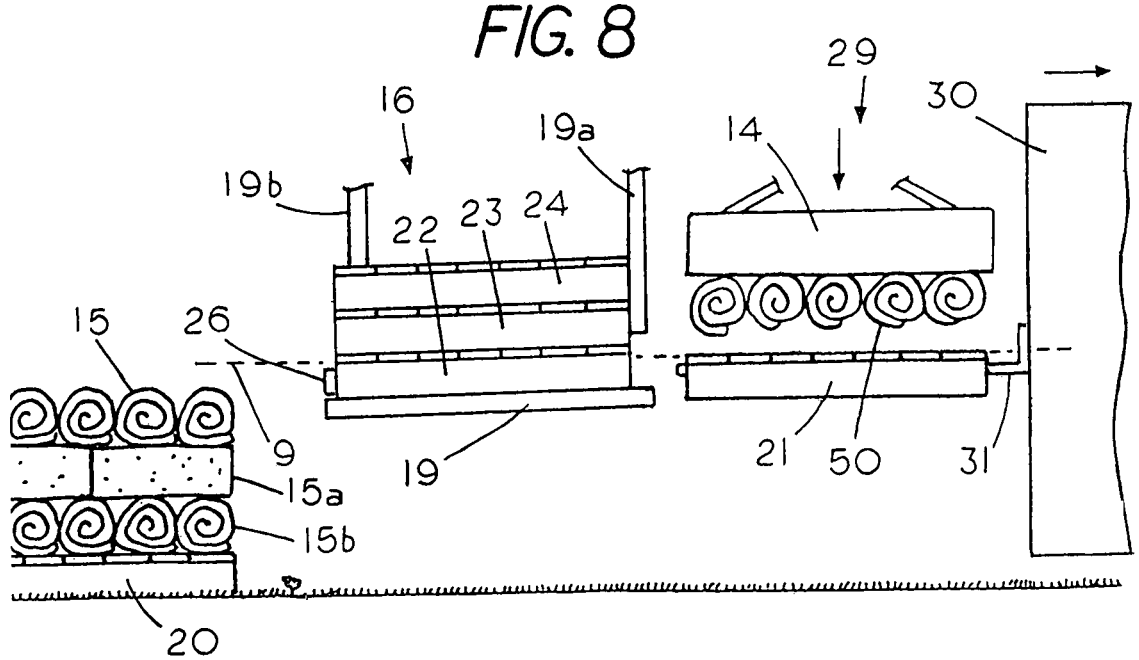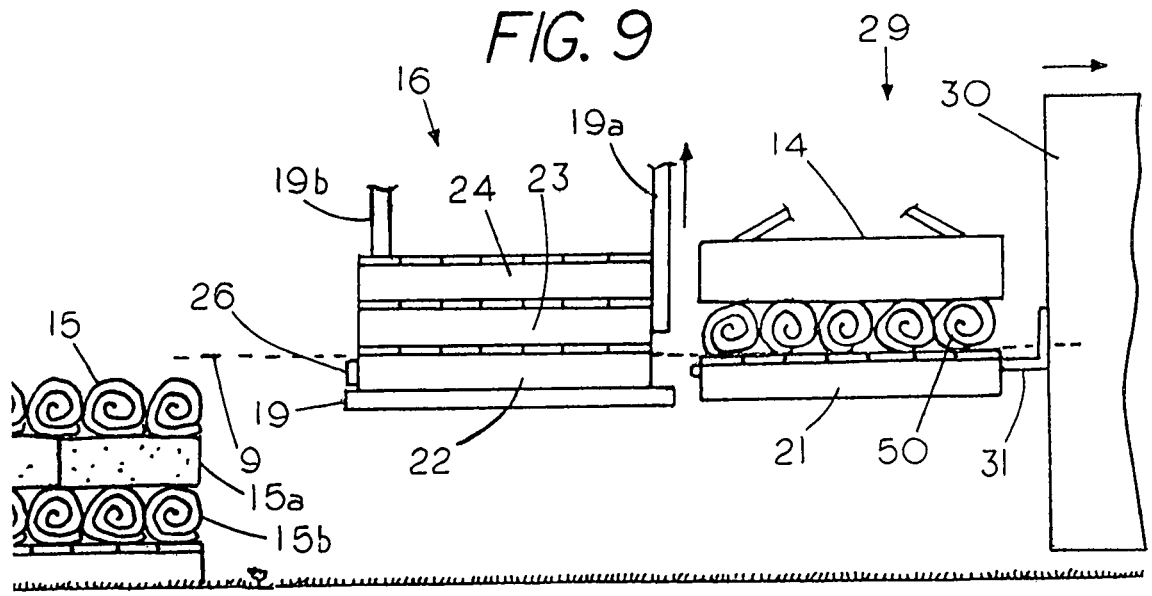

SOD HARVESTERS

CROSS REFERENCE TO RELATED APPLICATIONS

This application is a continuation in part of Ser. No. 15/731,667 filed Jul. 13, 2017

STATEMENT REGARDING FEDERALLY SPONSORED RESEARCH OR DEVELOPMENT

None

REFERENCE TO A MICROFICHE APPENDIX

None

BACKGROUND OF THE INVENTION

In on-the-go sod harvesting the sod harvester contains a set of internal sod stations and sod transfer mechanisms that require the completion of sequential steps before the sod harvester can transfer a cut sod slab onto a sod pallet, which is typically supported by pallet forks. Once the sod pallet is fully loaded the loaded sod pallet is left on the sod field for later pickup. As the sod harvester continues to cut sod from the sod field the sod harvester automatically replaces the loaded sod pallet, which is left on the sod field, with an empty sod pallet so the internal sod processing can continue. The sod handling cycle of cutting sod and stacking the sod on a sod pallet, which is left on the sod field for later pickup, is then repeated.

Oftentimes the time required for the sod handling cycle within the sod harvester limits the ground speed of the sod harvester, which limits the sod harvesting rate. One of the difficulties in increasing the sod harvesting rate is that there are limits to decreasing the time of the sod handling cycle by simply increasing the speed of sod harvester. That is, decreasing the time of the sod handling cycle by increasing the sod transfer speed in the sod harvester may adversely affect the integrity of a sod slab, which is held together by a fragile root system. The increased sod transfer speed may lead to spoiled sod slabs due to increased forces on the sod slabs which are caused by the increased speed of the abrupt sod handling motions, which are imparted to the sod slab as the sod slab is transferred between stations within the sod harvester. Spoiled sod slabs within the sod harvester can lead to a disruption of the sod harvesting process.

A further impediment to increasing the sod harvesting rate is that for field stacking of sod slabs the sequential sod handling steps within the sod harvester cannot be eliminated if one wants to cut and stack the sod slabs for machine pickup. For example, one part of the sod handling cycle requires the step of replacing the loaded sod pallet with and empty sod pallet in order for the sod harvesting processing to continue, which requires waiting until a loaded sod pallet clears the pallet holder station and the pallet holder station is an alignment with the pallet forks before an empty sod pallet can be loaded onto the pallet forks.

SUMMARY OF THE INVENTION

A sod harvester with an increased sod harvesting rate obtainable through a reduction in the time for completion of a sod handling cycle with the reduction in time obtained through changes in the interactions of the transfer mechanisms within the sod harvester. In one interaction an empty pallet is horizontally or obliquely loaded on to a pallet lift before the empty sod pallet is in lateral alignment with a pallet lift to decrease the internal sod processing time in the sod handling cycle. In another interaction two sod transfer mechanisms are coordinated to travel toward a sod pick up point at the same time. In both cases the internal sod processing time in the sod handling cycle is decreased without increasing the dynamic forces on the fragile sod slabs, which may cause spoilage of the sod slabs.

BRIEF DESCRIPTION OF THE DRAWINGS

FIG. 6 is an isolated side view of a portion of the sod harvester showing the pallet holder station moving vertically downward while an open face empty pallet carried therein has one end in contact with the pallet lift and the other end with the pallet holder station;

FIG. 7 is an isolated view of a portion of the sod harvester showing the ejected open board pallet falling downward into a sod receiving position while a sod transfer mechanism simultaneously lowers a plurality of sod rolls toward the empty pallet;

FIG. 8 is an isolated view of a portion of the sod harvester showing the sod transfer mechanism about to deposit a row of sod rolls onto the empty pallet on the pallet lift;

FIG. 9 is an isolated view showing a portion of the sod harvester with the sod transfer mechanism placing a row of sod rolls on top of a pallet on the pallet lift as the pallet holder station moves upward to a vertical position above a loaded sod pallet;

DESCRIPTION OF THE PREFERRED EMBODIMENT

Figure 1:
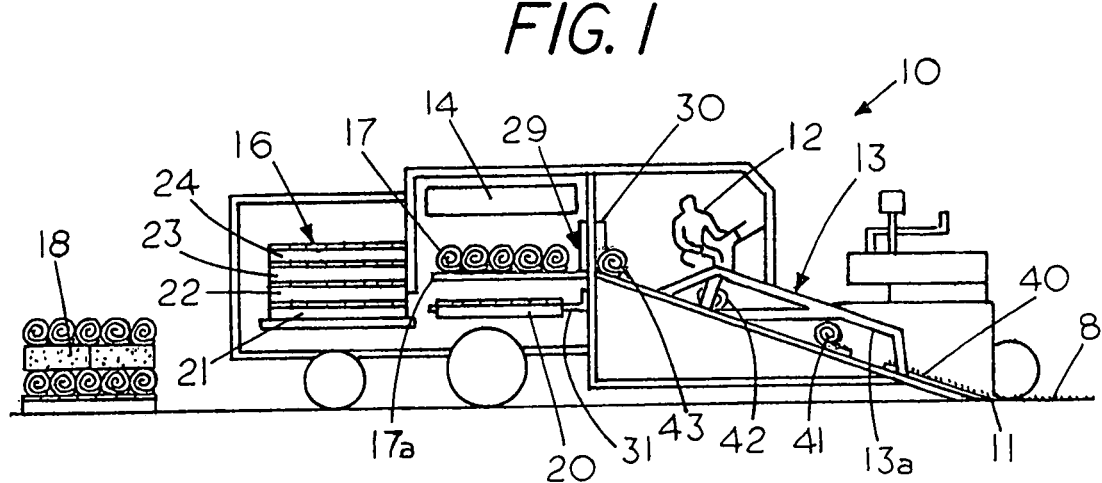
FIG. 1 is a side view of a sod harvester cutting sod slabs from a sod field and internally transferring the sod slabs onto a sod pallet for discharge on to the sod field.

FIG. 1 shows an operator 12 seated on a sod harvester 10 for on-the-go cutting and stacking a plurality of sod slabs for field pickup during a forward motion of the sod harvester. In this example sod harvester 10 includes a first station 13 having a sod cutting blade 11 for cutting a sod slab 40 free from a sod field 8 and an elevator 13a for elevating the sod slabs thereon to a second station 17 as the sod harvester moves forward. FIG. 1 shows multiple sod slabs 41,42 and 43 located on the sod elevator with each of the sod slabs formed into a sod roll. While the formation of sod rolls from sod slabs is shown in some cases one may prefer to cut and stack the sod slabs without formation of the sod slabs into sod rolls. An example of a sod harvester having a knife for freeing sod and forming a sod slab into a sod roll is shown in my U.S. Pat. No. 6,364,027, which is herby incorporated by reference.

Figure 13:
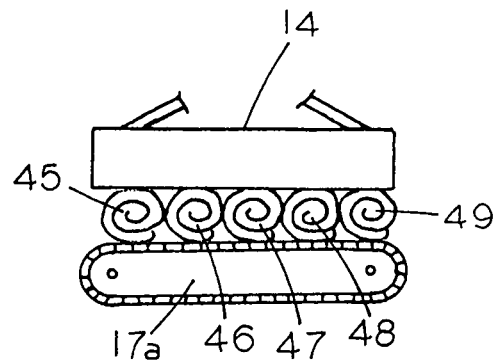
FIG. 13 shows the sod transfer mechanism and the sod accumulator in the sod pickup position with the sod transfer mechanism in engagement with the sod rolls on the sod accumulator.

In this example the sod slabs are formed into sod rolls 41, 42 and 43 and are delivered to a second station comprising a sod accumulator 17 that has a rotateable belt 17a that receives a sod roll on the end of the accumulator 17 proximate the elevator 13a. Once the sod roll is on accumulator belt 17a the top surface of the belt advances to the left to leave an empty space on the accumulator belt to receive an additional sod roll from the first station 13. Typically, the process of loading a sod roll and rotating the belt continues until the accumulator 17 is full, as shown in FIG. 1 and FIG. 13.

Located within sod harvester 10 is an overhead sod transfer mechanism or sod pick up head 14 for picking up sod rolls resting on accumulator 17 and transferring the sod rolls to a third station 29. An example of a sod transfer mechanism is shown in my U.S. Pat. No. 6,296,063 and is herby incorporated by reference.

Figure 4:
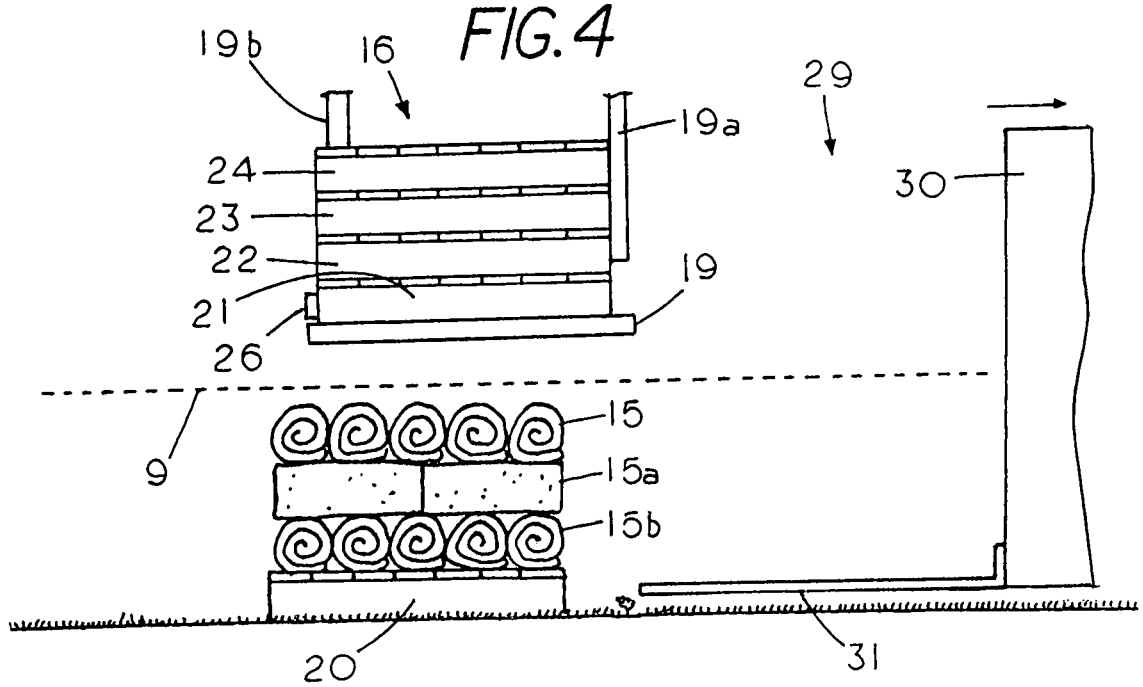
FIG. 4 shows the pallet holder station in the up position with the loaded sod pallet setting on the sod field as the pallet holder station clears the loaded sod pallet through forward motion of the sod harvester.
Figure 4A:
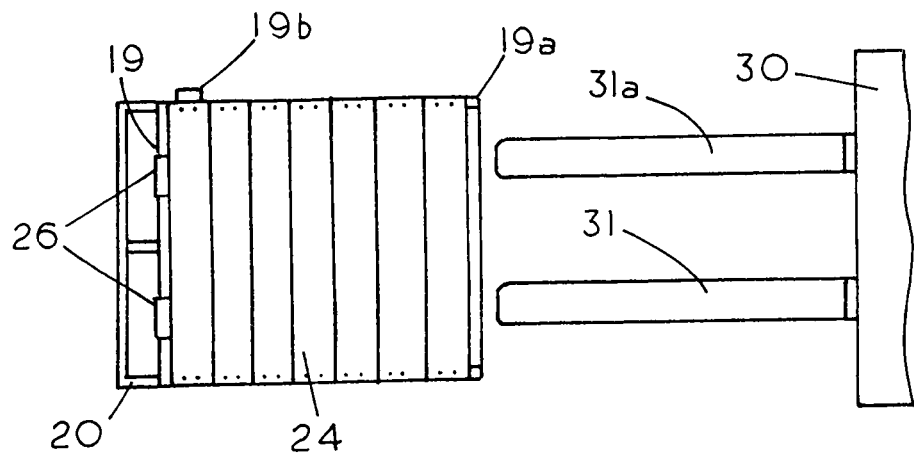
FIG. 4A is a top view showing the pallet holder station and the pallet forks in the pallet lift station.

Sod harvester 10 includes a pallet holder station 16 containing a stack of empty pallets 21, 22, 23, and 24 and a pallet lift station 29 with sod pallet 20 supported by a vertically positionable pallet lift 30 having a set of pallet forks 31 and 31a (FIG. 4A).

Figure 1A:
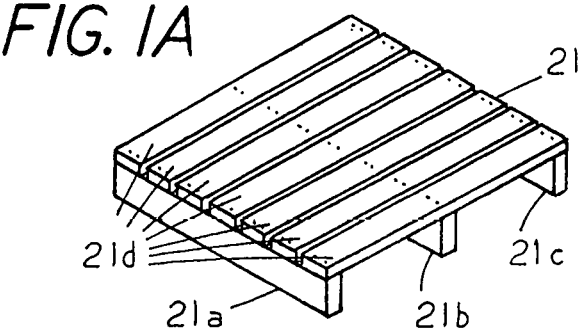
FIG. 1A is a perspective view of an empty open board sod pallet revealing an open face and a closed face.

FIG. 1A is a perspective view of an open board sod pallet 21 revealing a set of rigid wood rails 21a, 21b and 21c and a set of wooden boards 21d secured thereto to provide a platform for carrying articles with the open board sod pallet having a first bottom gap between rails 21a and 21b and a second bottom gap between rails 21b and 21c for insertion of pallet forks 31 and 31a therein.

FIG. 1 shows sod harvester 10 with a loaded sod pallet 18, which has been deposited on the sod field 8, as sod harvester 10 continues to harvest sod therefrom. In this example the sod handling cycle includes the cutting of the sod slab free from the sod field 8, the overhead sod transfer within the sod harvester, the transfer of the loaded sod pallet 18 onto the sod field 8 for machine pickup and the replacement of the loaded sod pallet on the pallet forks 31 and 31a with an empty sod pallet from the pallet holder station 16.

In the invention shown and described herein the sod harvester 10 has a shorter sod handling cycle obtainable thought an elimination of wait times within the sod harvester. The shorter sod handling cycle within the sod harvester, which is obtained by reducing wait times in the sod handling cycle, is obtained as described herein by changing the nature of the interactions or the timing of the interactions of the sod transfer mechanisms and without having to change the speed of overhead sod transfer within the sod harvester. Consequently, with a decrease in the time of the sod handling cycle in areas other than the overhead sod transfer one can increase the sod harvesting rate without adversely affecting the integrity of the sod slabs that are cut and stacked for field pickup. That is, the dynamic forces on the sod slabs during overhead transfer can be maintained at conventional levels that do not spoil the sod slab since one does not have to decrease the overhead sod transfer times in order to reduce the overall time of the sod handling cycle.

Figure 2:
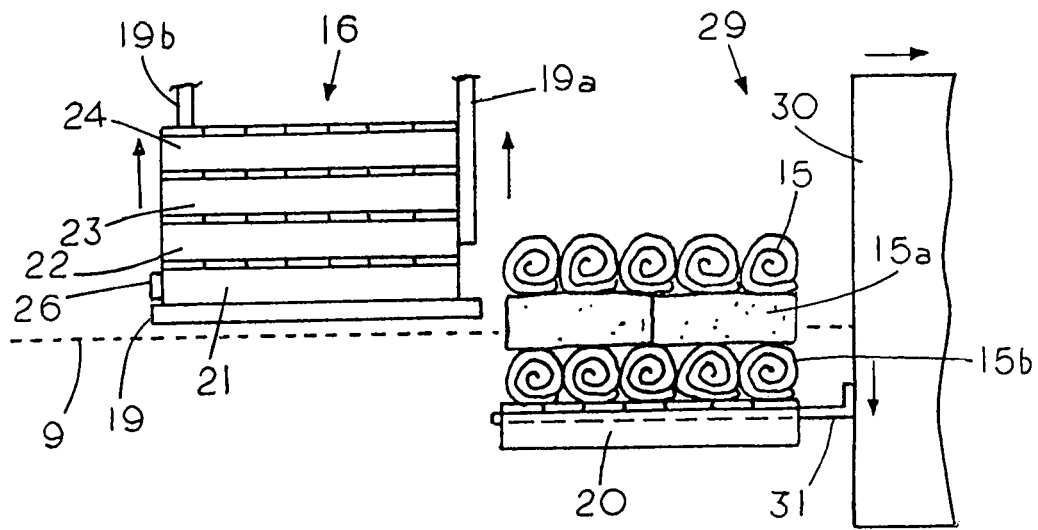
FIG. 2 is an isolated view of a portion of the sod harvester showing a pallet holder station, which contains empty pallets, moving upward and a pallet lift station having sod slabs therein moving downward as the sod harvester moves forward.

FIG. 2 also shows that the pallet holder station 16 and a third station 29 with a pallet lift 30 for supporting a pallet 20 and sod rolls thereon. In this example the pallet lift 30 includes a set of vertically displaceable pallet forks 31 and 31a (FIG. 4A) that are shown in a cantilevered engagement with sod pallet 20, which carries three layers of sod rolls 15, 15a and 15b.

FIG. 2 shows the vertically displaceable pallet holder station 16 contains a stack of empty pallets 21,22,23, and 24, which are supported therein in a stacked relationship by a bottom runner 19 and upright side members 19a and 19b. FIG. 2 shows the pallet holder station 16 with the empty pallets 21,22,23 and 24 thereon moving vertically upward as indicated by an upward pointing arrow proximate the pallet holder station 16. FIG. 2 also shows the loaded pallet 20, which contains three rows of sod rolls 15, 15a and 15b, moving vertically downward as indicated by a downward pointing arrow proximate pallet lift 30.

Since pallet holder station 16 and pallet forks 31 and 31a move vertically upward and downward at different times during the sod harvesting process a dashed line 9 is shown in the same vertical position in each of FIG. 2 to FIG. 9. The dashed line 9 enables a viewer to determine the relative vertical position of both the pallet holder station 16 and the pallet forks 31 and 31a with respect to each other as well as to the sod field during the step of transferring sod to an empty sod pallet, the step of transferring a loaded sod pallet to the sod field and the step of transferring an empty sod pallet from pallet holder station 16 onto the pallet forks 31 and 31a in pallet lift station 29.

Pallet holder station 16 includes a bottom member or rail 19 that supports the stack of empty pallets 21,22,23 and 24 thereon with the bottom member 19 forming a guide for sliding the bottom pallet 21 free of the stack of empty pallets, which are located on top of pallet 21. In this example pallet holder station 16 includes an ejector 26, which may comprise a hydraulic cylinder or a rotateable chain that is powered by the sod harvester 10. The ejector is shown proximate the end of the lowest empty pallet 21 for laterally sliding the bottom empty pallet 21 outward onto the pallet forks 31 and 31a in response to a signal from the harvester.

Figure 3:
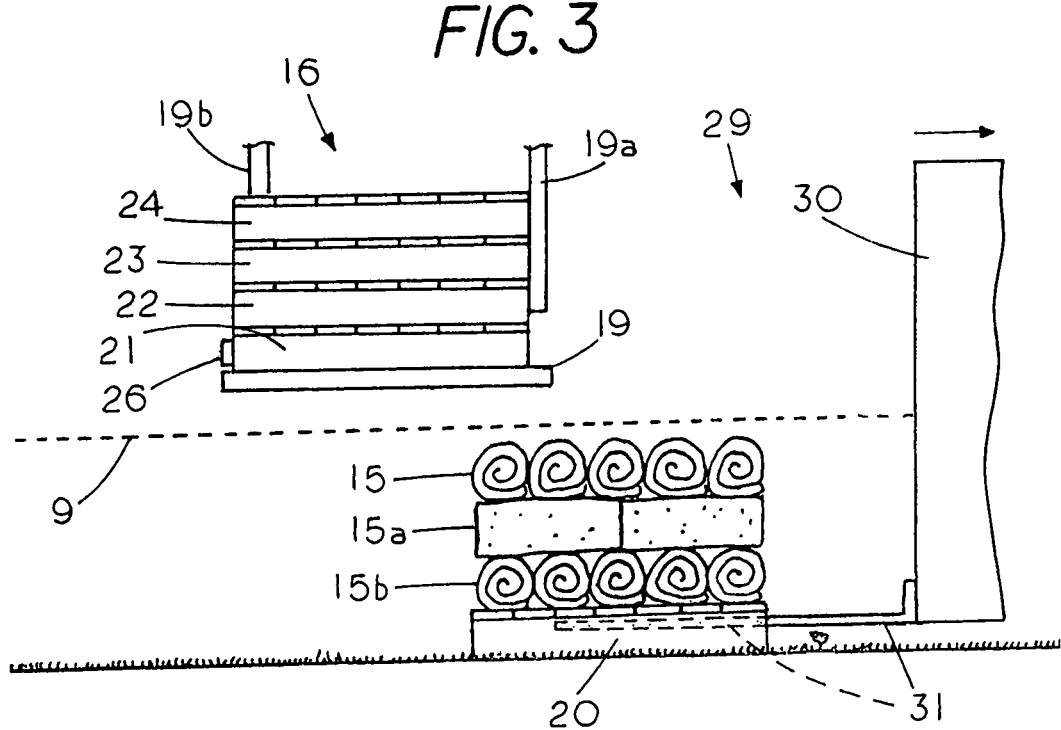
FIG. 3 is an isolated view of a portion of the sod harvester showing the pallet holder station with the pallet holder station in the up position and a pallet lift station with a pallet lift in a down position as the pallet lift disengages from a loaded sod pallet through ground engagement of the loaded sod pallet with the sod field as the pallet lift in the sod harvester moves forward.

FIG. 3 shows the vertically displaceable pallet holder station 16, which is part of the harvester 10, has been vertically positioned upward to allow a loaded sod pallet 20 to pass beneath the pallet holder station 16 as the sod harvester continues its forward motion. The vertically displaceable pallet holder station 16 is also vertically positionable downward to a pallet transfer position where an empty pallet therein can be transferred onto empty pallet forks 31 and 31a in the pallet lift station 29.

FIG. 3 and FIG. 4 show the pallet holder station 16 in the up or clearance position and a loaded pallet 20 in a ground engaging position with the set of pallet forks 31 and 31a disengaging from the loaded sod pallet 20 as the sod harvester 10 with pallet lift 30 moves forward. Note, in this position the top of the loaded sod pallet 20 is below the bottom of the pallet holder station 16, which allows the sod harvester to move forward while leaving the loaded sod pallet 20 on the sod field for later pickup.

FIG. 4A is a top view showing the pallet holder station 16 and the empty pallet forks 31 and 31a in a position before the ejection of an empty pallet onto the pallet forks 31 and 31a while FIG. 4 shows the pallet holder station 16 in the up position with the loaded sod pallet 20 setting on the sod field as the top of the loaded sod pallet 20 clears the underside of pallet holder station 16 as sod harvester 10 continues its forward sod cutting motion. As part of the sod handling cycle the pallet holder station 16 must remain in the up position until pallet holder station clears the loaded pallet 20. Once cleared the pallet holder station can be lowered for transferring an empty pallet onto the pallet forks, which have been raised once the pallet forks have disengaged from the sod pallet 20.

Figure 5:
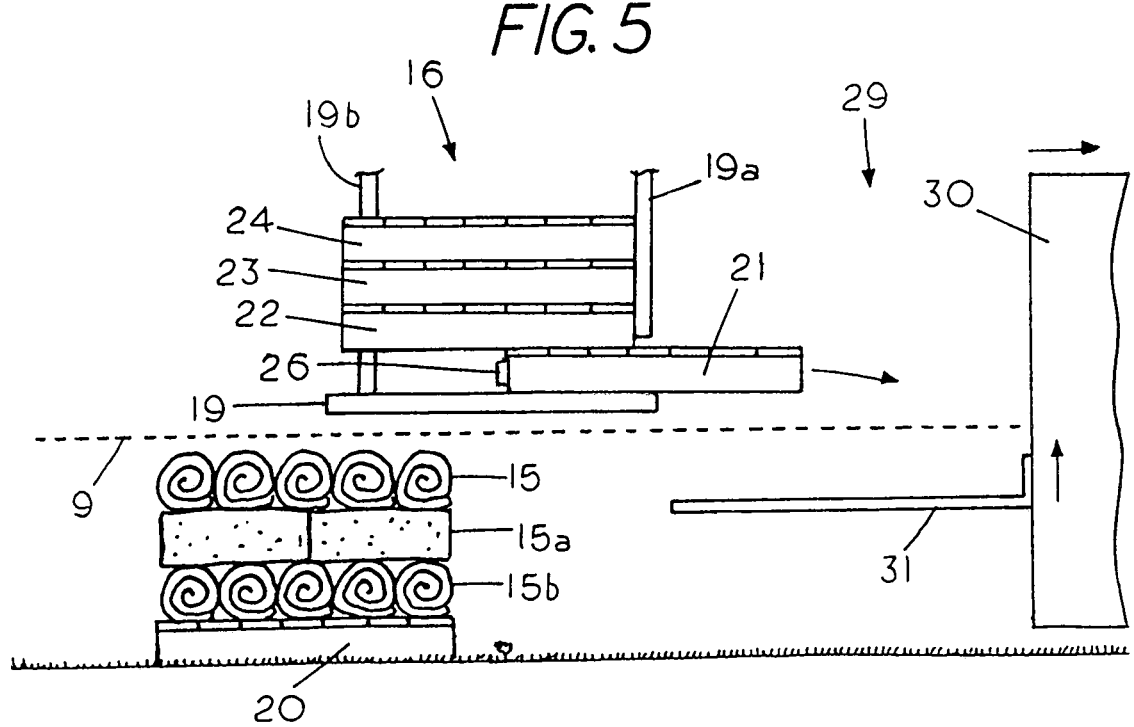
FIG. 5 is an isolated view of a portion of the sod harvester showing the pallet lift station with the pallet lift moving upward while the pallet holder station remains in the up position as an empty pallet is being ejected.

FIG. 5 is an isolated view showing the pallet lift 30 with the pallet forks 31 and 31a moving upward while the pallet holder station 16 remains in the up position to provide clearance between the top of the loaded sod pallet 20 and the underside of the pallet holder station 16 as the sod harvester continues to move forward. That is, after the loaded sod pallet 20 is allowed to slide off the pallet forks 31 and 31a the empty pallet forks 31 and 31a are vertically displaceable upward to a sod receiving position as illustrated in FIG. 6. During the sod handling cycle the pallet forks arrive at a pallet receiving position (FIG. 6) before the pallet holder station 16 can be lowered to a position where an empty pallet can be laterally slid onto the pallet forks 31 and 31a. Consequently, the step of lowering the pallet station 16 to a position where an empty sod pallet can be laterally ejected onto the pallet forks 31 and 31a introduces a wait time in the sod handling cycle. In the invention described herein, the timing and the nature of interaction of the ejection of the empty pallet 21 and the pallet lift station 30 is changed. FIG. 5 shows the pallet 21 extending partially outwardly from the pallet holder station 16. In this example the weight of the empty pallets 22,23 and 24 on the end of pallet 21 within the pallet holder station 16 maintain pallet 21 in a general horizontal condition as the pallet 21 is ejected onto the pallet forks 30 and 31, which also extend in a horizontal condition. In other cases the empty open board pallet, which is normally laterally or horizontally ejected onto the pallet forks 31 and 31, may be horizontally ejected to begin the first phase of ejection from pallet holder station 16 but in the latter phase of the ejection the open board pallet is obliquely ejected onto the pallet forks (FIG. 6) since the weight on the end of the pallet may not be sufficient to cantileverly hold the pallet 21 in a horizontal or near horizontal condition. In either case the pallet 21 is ejected onto the pallet forks before a pallet on the pallet holder station 16 is in lateral alignment with the pallet forks. Also in either case the empty pallet 21 falls into a sod receiving position (FIG. 7 and FIG. 8). Thus, the wait time in the sod harvesting cycle for replacing an empty pallet on the pallet forks is shortened since the pallet transfer begins before the ejected pallet in the pallet holder station is in laterally alignment with the pallet forks 31 and 31a. As shown in FIG. 6 and FIG. 7 the open boarded pallet 21 falls into the sod receiving position on the pallet forks rather than waiting for the pallet holder station to be lowered to a position where the pallet 21 can be laterally slid into the pallet forks. Consequently, the reduced time of the pallet transfer in the sod handling cycle also reduces the transfer head 14 wait time for transferring sod onto the empty sod pallet on the pallet forks.

FIG. 6 is an isolated side view showing the pallet holder station 16 moving vertically downward while an open face empty pallet 21 carried thereon is being ejected from the moving pallet holder station 16. In this view the empty pallet 21 is partially loaded onto pallet forks 31 and 31a as pallet 21 has one end in contact with the pallet forks 31 and 31a and the other end in contact with the pallet holder station 16. The pallet holder station 16 remains above the reference line 9 indicating the downward motion of the pallet holder station 16 will not interfere with the sod rolls on sod pallet 20. A feature of the invention described herein is the empty sod pallet 21 is horizontally or obliquely ejected onto the empty pallet forks 31 and 31a as the pallet holder 16 descends or before the pallet holder descends, that is before the sod pallet 21 is in lateral alignment with the pallet forks 31 and 31s thereby eliminating a wait time in the sod handling cycle since the empty sod pallet falls into a position to immediately receive a roll of sod slabs from the sod transfer head. Thus, the invention eliminates wait time for replacing the empty sod pallet since the empty sod pallet does not need to reach lateral alignment with the pallet forks before the empty sod pallet can be transferred onto the pallet forks. As a result one can increase the harvesting rate of the sod harvester without increasing the speed of the transfer head and consequently the forces on the sod rolls, which occur as the transfer head stops and starts as the sod rolls held thereon are moved from the sod roll accumulator to the sod pallet on the sod forks.

FIG. 7 is an isolated view showing the empty open boarded pallet 21 falling downward into a sod roll receiving position on top of pallet forks 31 and 31a while an overhead sod transfer mechanism or overhead transfer head 14 simultaneously lowers a plurality of sod rolls 45 toward the empty pallet 21 on the pallet forks 31 and 31a. In this example, the time of the sod handling cycle is decreased through changing the point of interaction between the sod pallet station 16 and the pallet forks 31 and 31a by eliminating the transfer head wait until after the pallet holder station 16 has pallet 21 in alignment with the pallet forks 31 and 31a. Consequently, the on-the-go interaction with the horizontal or oblique ejection of the empty sod pallet reduces the time of the sod handling cycle since the internal sod transfer in the sod harvester can begin before the empty sod pallet is alignment with the pallet forks.

FIG. 5, FIG. 6 and FIG. 7 illustrate the feature of an initial horizontal ejection of pallet 21 and a subsequent angled on-the-go or oblique ejection of an empty sod pallet 21 onto the pallet forks 31 due to the pallet lacking end support after being ejected from the pallet holder station. That is, the sod pallet 21 is initially ejected in an orientation normal to pallet holder 16 but before the empty pallet 21 is in lateral alignment with the pallet forks, which eliminates wait time for the pallet 21 in pallet holder 16 to reach a position of lateral alignment with the pallet forks 31 and 31a before the pallet is ejected. In this example the top surface of the smooth pallet forks 31 and 31a allows the empty sod pallet 21 to angularly and slidingly engage the pallet forks 31 and 31a while the rails 21a, 21b and 21c on the pallet 21 help to maintain the sod pallet 21 in pallet fork alignment as the pallet 21 slides into a loading position on pallet forks 31 and 31a. As pointed out the time of the sod handling cycle is decreased through changing the point of interaction between the sod pallet station 16 and the pallet forks 31 and 31a by eliminating the wait for the pallet holder station 16 to have an empty pallet in lateral alignment with the pallet forks 31 and 31a, which allows a quicker initiation of the transfer of sod rolls to the sod pallet 21.

FIG. 8 is an isolated view showing the sod transfer mechanism 14 about to deposit a row of sod rolls 45 onto the empty pallet 21 on the pallet forks 31,31a. Note, although the pallet 21 was angularly or obliquely inserted onto pallet forks 31 and 31a the pallet 21 falls into a horizontal sod receiving position that allows vertical placement of sod rolls 45 thereon.

FIG. 9 is an isolated view showing the sod transfer mechanism 14 at the moment of release of a row sod rolls 45 on top of a pallet 21 on the pallet forks 31 and 31a. Note, the pallet holder station 16 is shown moving to an up position so that the bottom of the pallet holder station 16 is above the reference line 9 thus ensuring that a loaded sod pallet can freely pass underneath the pallet holder station 16.

Figure 10:
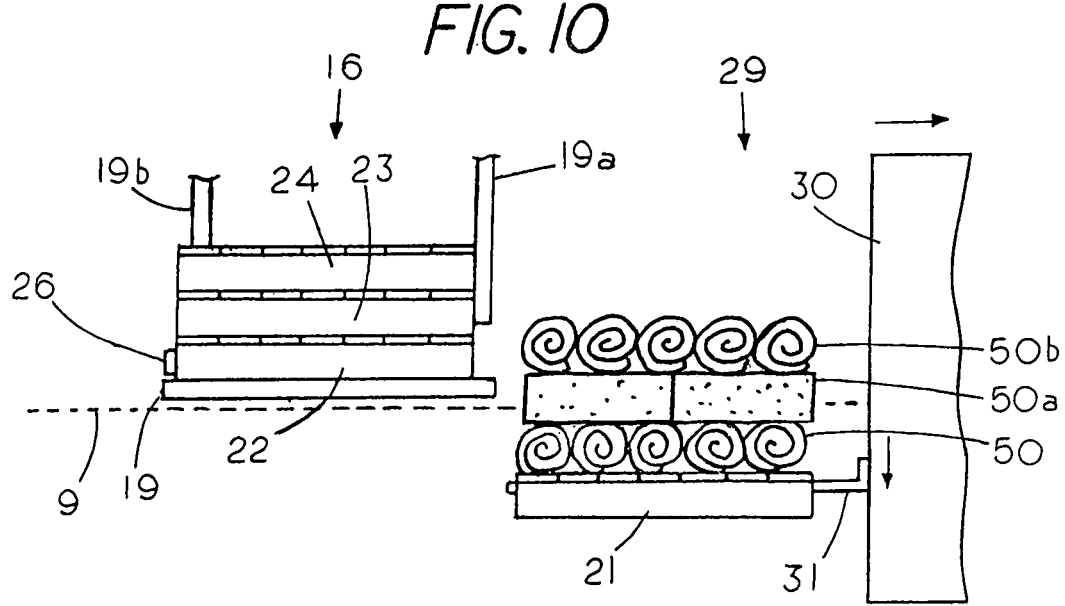
FIG. 10 is an isolated view of a portion of the sod harvester with the pallet holder station in an upward position for clearance of a loaded pallet thereunder and a loaded sod pallet on the pallet lift moving downward for engagement with the sod field as the sod harvester moves forward.

FIG. 10 shows the pallet holder having reached an upward position for passage of a loaded pallet thereunder while the loaded sod pallet 21 moves downward for engagement with the sod field as the sod harvester moves forward. Once sod pallet 21 is in ground engagement the sod pallet 21 slides off the pallet forks 31 and 31a and the cycle repeats.

Figure 11:
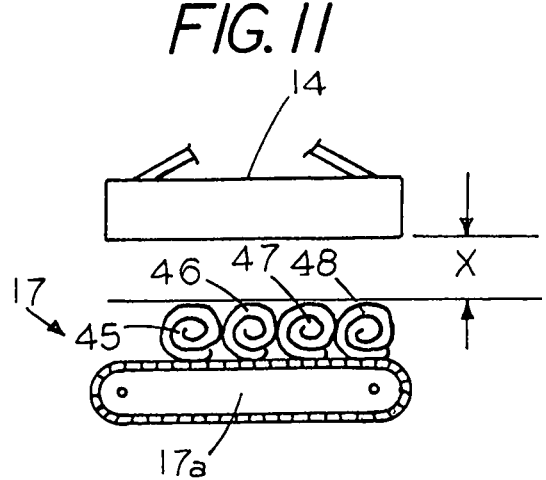
FIG. 11 is an isolated view of a sod accumulator and a sod transfer mechanism prior to arriving at a sod pick up position.
Figure 12:
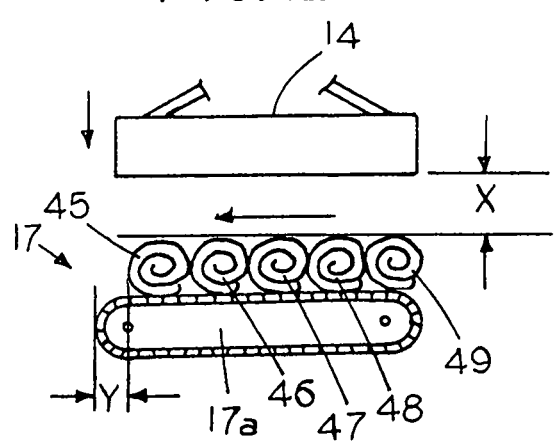
FIG. 12 is an isolated view of the sod accumulator and the sod transfer mechanism at the moment the sod transfer mechanism begins its descent to a sod pick position and the moment the sod accumulator initiates its move to the sod pickup position.

FIG. 11 to FIG. 13 illustrate another feature of the invention that can be used to further reduce the sod handling cycle time within the sod harvester. In this example, FIG. 11 shows an isolated view of sod accumulator 17 and the overhead sod transfer head 14 prior to sod pick up contact with a row of sod rolls. Note, four sod rolls 45,46,47 and 48 are located on sod accumulator 17, which comprise a rotatable belt 17a. In this example one lowers the sod transfer head 14 a distance x before the sod transfer head 14 picks up the sod rolls on the sod accumulator belt 17a. However, before the sod rolls 45,46,47 and 48 are to be picked up it is necessary for the accumulator belt 17a to move sod rolls 45,46,47 and 48 to the left as well as bring a fifth sod roll 49 onto sod accumulator belt 17 and into a sod roll pickup position directly below the sod transfer head 14.

FIG. 12 is an isolated view of the sod accumulator 17 and the sod transfer head 14 at the moment the sod transfer head 17 begins its vertical descent to a sod roll pickup position. Note, in this condition the sod transfer head 14 has to move downward a distance x and the sod rolls on the accumulator belt 17a has to move left a distance y before the sod transfer head 14 is in the sod roll pickup position where the transfer head 14 and the sod rolls 45,46,47,48 and 49 are in vertical alignment with each other as shown in FIG. 13. In order to reduce the internal sod handling time within the sod harvester the descent speed of the sod transfer head and the lateral speed of the sod accumulator belt 17a are coordinated so the sod transfer head 14 and the sod rolls 45,46,47,48 and 49 arrive at the sod roll pick up position at same time, which is illustrated in FIG. 13 that shows the sod transfer head 14 in top engagement with all five sod rolls 45,46,47,48 and 49 and in a position to simultaneously transfer all five sod rolls 45,46,47,48 and 49 to another station in the sod harvester. Alternately, the sod transfer head 14 may be allowed to arrive slightly after the sod rolls arrive the sod pickup position but not before the sod rolls arrive at the sod pickup position.

Figure 14:
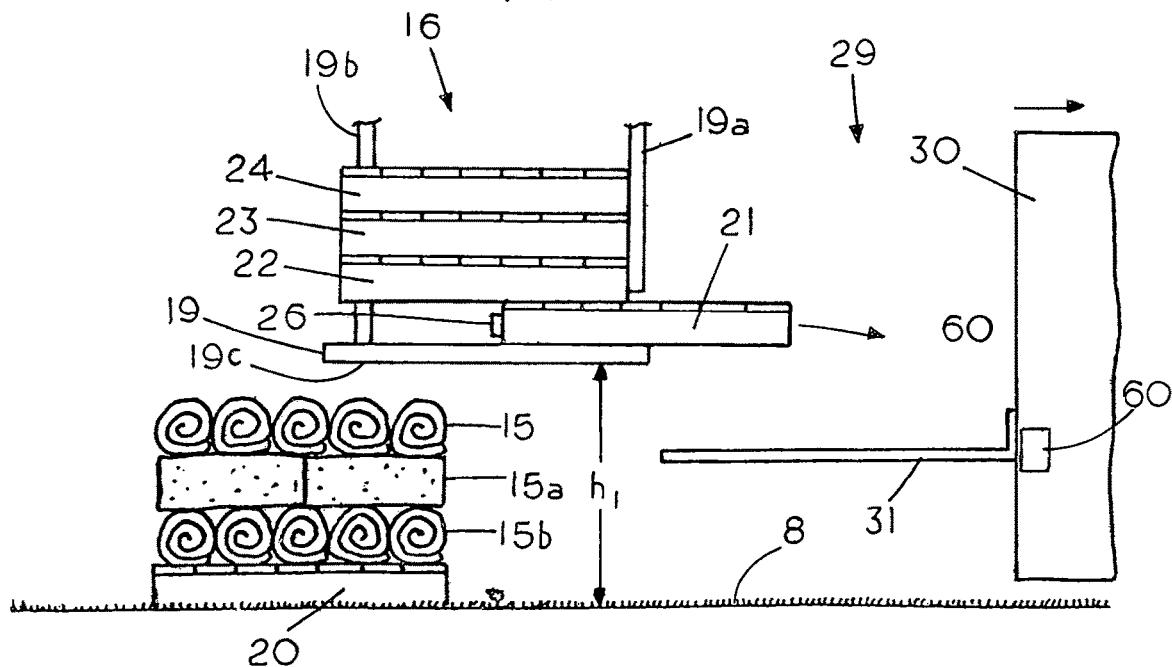
FIG. 14 is an isolated view of a portion of the sod harvester showing the pallet lift station moving upward while the pallet holder station remains in an up or fixed position above the sod rolls on the field as an empty pallet is ejected.
Figure 15:
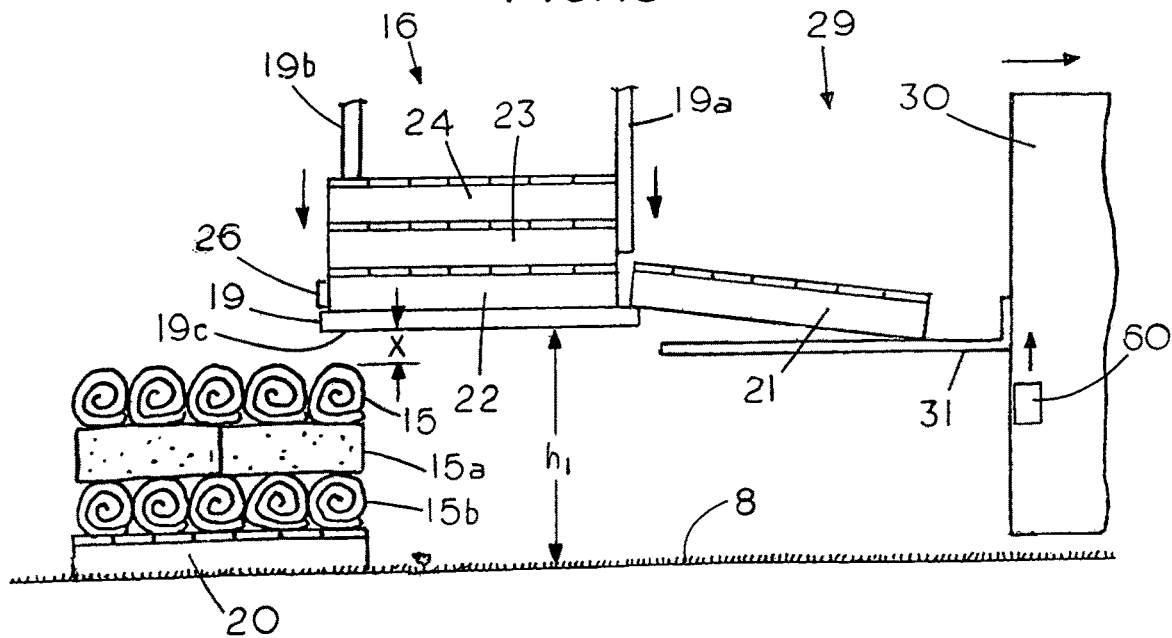
FIG. 15 is an isolated side view of a portion of the sod harvester showing the pallet holder station remaining in the up position as an empty pallet is ejected while an open face empty pallet carried therein has one end in contact with the pallet lift and the other end with the pallet holder station.
Figure 16:
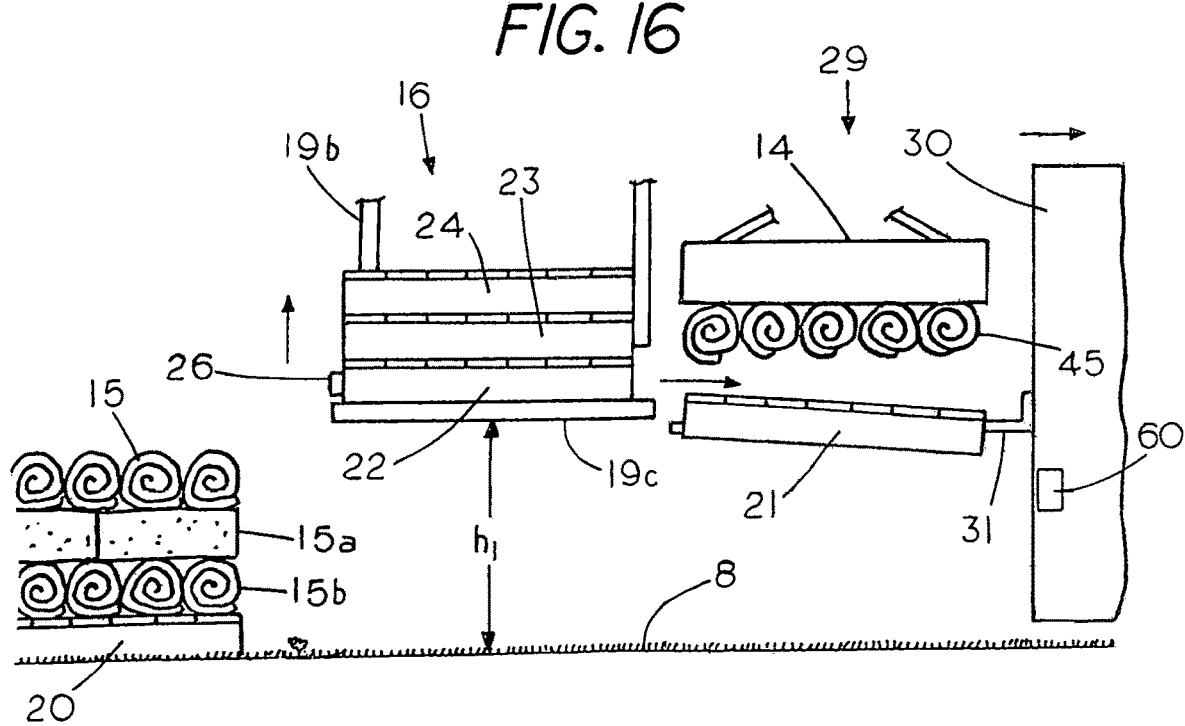
FIG. 16 is an isolated view of a portion of the sod harvester showing the ejected empty pallet falling downward into a sod receiving position while a sod transfer mechanism simultaneously lowers a plurality of sod rolls toward the empty pallet on the pallet holder station.

FIG. 14, FIG. 15 and FIG. 16 show an alternate embodiment of a third station 29 on sod harvester 10 that reduces the time of a sod handling cycle in a sod harvester with a static pallet holder station 16, which is not vertically displaceable or if vertically displaceable remains in a fixed vertical position during a sod handling cycle. In this example the pallet lift station 31 moves vertically upward while pallet holder station 16 remains in a stationary position, which is a distance $h_1$ above the sod field 8, with the top of the sod rolls 15c separated from the pallet holder bottom 19c by a clearance distance x, which is sufficient to allow pallet 20 and the sod rolls thereon to pass freely under the pallet holder station 16. While the distance x may be selected based on field conditions in most cases a couple of inches clearance is sufficient to allow the sod pallet 20 and the sod rolls thereon to pass freely under the pallet lift station 16 during a forward movement of the sod harvester. Thus, in this example the pallet holder station 16 remains in a fixed vertical position as the pallet lift station 31 moves upward to a sod roll loading position as shown in FIG. 8. To reduce the time of the sod harvesting cycle the pallet ejector 26 initiates ejection of an empty pallet 21 before the empty pallet 21 is in lateral alignment with the pallet forks 31. In this example the pallet ejector 26 is responsive to a vertical position of the pallet forks 31. For example, a pallet lift position switch 60 on pallet lift station 30 connected to the pallet ejector activates the pallet ejector 20 to begin the laterally ejection of the pallet 21 from pallet holder station 16 as the pallet forks 31 move upward to the sod receiving position.

FIG. 15 is an isolated view showing a partially ejected open board pallet 21 falling downward onto pallet forks 31 and FIG. 16 is an instant later when the ejected open board pallet 21 has fallen to a near horizontal sod receiving position as sod transfer mechanism 14 approaches a release position of the sod rolls 45. In this example one lowers a plurality of sod rolls 45 onto the empty pallet 21 on the pallet holder station 29 as the pallet 21 arrives at a sod roll receiving position, preferably for simultaneous arrival. Thus, a wait time for the sod pallet 21 to be brought into proper position for receiving sod rolls can be eliminated through the simultaneous or near simultaneous arrival of the sod pallet 21 and the sod rolls 45. As shown herein the invention reduces the time of sod harvesting cycle in those sod harvesters where the pallet holder station 16 remains in a fixed or static position or in those sod harvesters where the pallet holder station moves vertically up and down during the sod handling cycle. If the pallet holder station is vertically displaceable as shown in FIGS. 1-13 the ejection of the pallet from the pallet holder occurs based on a position of a moving pallet holder with respect to rising pallet forks. With the static pallet holder station as shown in FIGS. 14-16 the ejection of the pallet also occurs based on the relative position of the pallet holder to the rising pallet forks, however, since the static pallet holder remains fixed the ejection of the pallet from the pallet holder can be based on a vertical height of the rising pallet forks. Thus a position switch 60 that detects when the pallet forks have reached a fixed height may be used to initiate ejection of a pallet from the pallet holder station thus making the pallet ejection dependent solely on the vertical position of the pallet forks.

I claim:

1. A method of decreasing the time of a sod handling cycle in a sod harvester as the sod harvester cuts and stacks sod slabs for field pickup comprising the steps of:

transferring a plurality of sod slabs to an open board pallet carried on a vertically positionable pallet lift during a forward motion of the sod harvester;

lowering the vertically positionable pallet lift with the open board pallet thereon until a set of rails located on an underside of the open board pallet engage the sod field as the sod harvester continues the forward motion thereby disengaging the open board pallet from the pallet lift through ground engagement of the set of rails located on an underside of the open board pallet with the sod field;

raising the pallet lift after the disengaging the open board pallet from the pallet lift; and laterally ejecting an empty open board pallet from a bottom of a stack of empty board pallets before the pallet lift is in lateral alignment with the empty open board pallet;

allowing the open board pallet to fall onto the pallet lift with the ejection of the empty open board pallet initiated in response to a vertical position of the vertically positionable pallet lift as the vertically positionable pallet lift is raised.

2. The method of claim 1 including the step of horizontally and obliquely ejecting the empty open board pallet onto the vertically positionable pallet lift.

3. The method of claim 1 including the step of laterally ejecting the open board pallet while a pallet holder station is maintained in a static condition.

4. The method of claim 1 including the step of moving a sod transfer head to a sod pick up position while moving a row of sod slabs to the sod pick up position for arrival at a sod pickup station at the same time to further decrease the time of the sod handling cycle.

5. The method of claim 4 including the step of forming the row of sod slabs into sod rolls in the sod harvester.

6. The method of claim 1 wherein the set of rails slidingly guide the open board pallet onto the vertically positionable pallet lift as the vertically positionable pallet lift elevates to a sod receiving position.

7. The method of claim 1 wherein a row of sod slabs on a sod slab accumulator arrive at a sod roll pickup position at the same time a sod transfer head arrives at the sod roll pickup position to thereby eliminate a wait time in the sod handling cycle.

8. The method of claim 1 wherein a sod transfer head and a sod slab accumulator traverse different distances but arrive at a sod roll pick up position at the same time.

9. The method of claim 1 wherein an empty open board pallet located at the bottom of a static pallet holder station is ejected as the static pallet holder station remains in a fixed vertical position.

10. The method of claim 1 wherein a sod slab transfer head and a sod slab accumulator carrying a row of sod slabs thereon are both advancing at the same time to simultaneously arrive at a sod pick up position.

11. The method of claim 1 wherein a first end of an empty open board pallet located at a bottom of the stack of empty open board pallets engages the vertically positionable pallet lift as the empty open board pallet located at a bottom of the stack of empty open board pallets obliquely slides onto the vertically positionable pallet lift.

12. The method of claim 1 wherein the open board pallet falls onto the vertically positionable pallet lift before a sod slab transfer head transfers a row of sod slabs to the empty open board pallet on the vertically positionable pallet lift.

* * * * *